United States Patent [19]

Jacob

[11] Patent Number: 4,771,633

[45] Date of Patent: Sep. 20, 1988

[54] CELL FOR TESTING THE SEALING QUALITY OF AN OIL-WELL SAFETY-VALVE, A TESTING PROCESS AND VALVE FOR USE THEREIN

[75] Inventor: Jean-Luc Jacob, Lescar, France

[73] Assignee: Merip Oil Tools International S.A., Serres-Castet, France

[21] Appl. No.: 924,460

[22] Filed: Oct. 29, 1986

[30] Foreign Application Priority Data

Jul. 29, 1986 [FR] France ................ 86 11422

[51] Int. Cl.$^4$ ............................. E21B 47/00
[52] U.S. Cl. ..................................... 73/151
[58] Field of Search ............ 73/151, 155, 168, 37

[56] References Cited

U.S. PATENT DOCUMENTS 4,337,653  7/1982  Chauffe ............................ 73/151

Primary Examiner—Jerry W. Myracle
Attorney, Agent, or Firm—Harold H. Dutton, Jr.

[57] ABSTRACT

A cell for testing the sealing of an oil-well safety valve with a tubular valve body comprising at its lower part a balancing gate (13) and a shutter (11), the test cell including a tubular enclosure (22) designed to be fixed around the lower valve part by a fastening ring (212) and keys (213, 214), a first conduit (209) associated with seals (205, 206) and capable of being pressurized for testing the sealing of the gate (13), and a second conduit (211) capable of being pressurized for separately testing the sealing of the shutter (11).

8 Claims, 2 Drawing Sheets

CELL FOR TESTING THE SEALING QUALITY OF AN OIL-WELL SAFETY-VALVE, A TESTING PROCESS AND VALVE FOR USE THEREIN

This invention relates to the field of safety valves inserted into the production pipes of oil wells for opening or closing them. More particularly, the invention relates to a test-cell for testing the tightness of such valves and a process for such testing. The invention also relates to a valve adapted to carry out these tests.

BACKGROUND AND OBJECTS OF THE INVENTION

The purpose of oil well safety valves is to automatically stop production of the effluent in case of an accident at the head or downstream of these valves. The valves controlled hydraulically from the surface to open and automatically close by means of a strong return spring the moment there is a drop in hydraulic pressure, whether controlled or accidental. These valves have been the object of much research concerning development and improvements, and they are widely used in particular in offshore wells.

In order to facilitate understanding the invention, it is assumed in the following description that the valves assume the positions corresponding to those they have in an oil well, the terms "high", "low", "upper", "lower" referring to such positions.

Essentially such valves comprise a valve body of generally tubular shape, provided at the lower part with a compensating or balancing gate issuing into the balancing chamber, a movable ball or flap shutter which, in the closed position, separates the balancing chamber from the lower end of the overall valve, called the valve "tip", the shutter being spring-biased toward the closed position, a tubular slide housed in the valve body for opening the shutter when descending or moving downwardly, a return spring designed to bias the slide toward a higher position corresponding for closing the shutter, hydraulic displacement means for moving the slide downward to push the shutter toward the open position, and a holding system located at the higher part of the valve body to fix the overall valve in the production pipe (which for that purpose is provided with a suitably shaped receiving sleeve).

Presently such valves are tested at the surface by inserting them into a production pipe which is pressurized in such a manner as to simulate actual operating conditions. However these tests require substantial time and are difficult to carry out, and furthermore, when a leak is detected, do not permit locating the defect. As a result the operator haphazardly carries out repairs either on the flap system and its tightness or on the compensating system and its tightness.

Accordingly, a primary object of the present invention is to overcome these drawbacks by creating a specific cell for testing the seals of the oil well safety valves.

Another object of the invention is to make it possible to carry out these tests in substantially less time by means of operations which are greatly simplified.

Another object is to allow immediate location of any defect.

DESCRIPTION OF THE INVENTION

To that end, the sealing test-cell of the invention comprises a tubular enclosure that can cover the overall valve body at its lower part in the region of its tip and its balancing chamber, the enclosure comprising a bottom closing it at one end on the side at the valve tip, means fastening the enclosure on the valve body, two inner cylindrical portions assuming the shape of the outer valve body near its balancing gate and on either side of same, two seals located on each of the cylindrical portions so as to be located above and below the balancing gate and resting against the body of the overall valve, a high aperture in the enclosure wall between the above seals to be opposite the balancing gate, a low aperture in the enclosure wall near its bottom to be opposite the valve tip, and pressurizing conduits hooked up to the above apertures.

The testing process for such a cell comprises inserting the tip of the valve to be tested in the cell tubular enclosure, fastening the enclosure on the valve body so that the seals of the cell are located on either side of the balancing gate of the valve and in separately performing tightness tests on the valve balancing gate and its shutter in the closed position, by successively pressurizing the conduits hooked up to the test cell.

In this manner the operator localizes any defect and can carry out remedial work solely on the defective part before checking this part again.

This testing is easy and quick because it does not require placing the valve into a well pipe. It is sufficient to cover the valve by the cell and to fasten the cell around the valve body.

In a preferred embodiment, the fastening means provided for that purpose comprises a fastener sleeve threaded at its low portion and provided with an upper locking collar, an outer thread at the high end of the enclosure to cooperate with the sleeve thread, and at least one longitudinal locking key in particular comprising a ring-section piece which can be inserted into an annular groove around the valve body above the balancing gate.

After the sleeve has been put in place around the valve body, the fastening is carried out merely by inserting the key(s) into the annular valve groove and by screwing the fastener sleeve around the threaded upper end of the enclosure (which was made to cover the valve tip as far as the keys).

The invention also covers an oil-well safety valve fitted for testing by the above described cell. This valve, of which the general type is described above, is characterized by its tubular body comprising on its outer periphery an annular groove above the balancing gate for the purposes of inserting the above mentioned fastener keys.

DESCRIPTION OF THE DRAWINGS

Other features, purposes and advantages of the invention will be come clear from the description below in relation to the attached drawings which show illustratively and without limitation, a preferred embodiment.

DETAILED DESCRIPTION OF THE INVENTION

Figure 1:
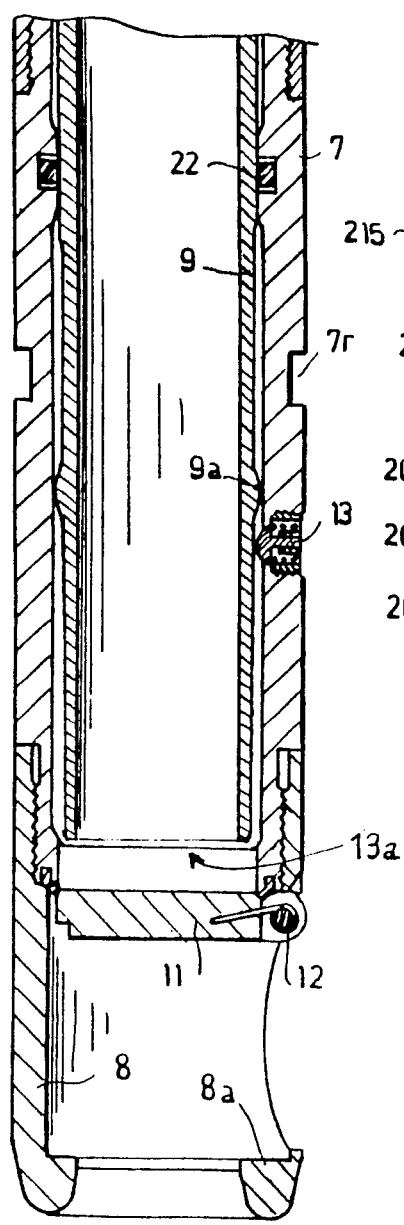
FIG. 1 is a partial axial sectional view of a valve of the invention.

The safety valve partially shown and in illustrative manner in FIG. 1 is adapted to be installed in an oil-well production pipe. At the high end it includes in conventional manner an anchoring lock (not shown) for anchoring and locking it in a receiving sleeve inserted into the production pipe. This receiving sleeve comprises an intake of control fluid which moves downwardly a tubular slide 9 within the valve when the fluid is pressurized. This hydraulic displacement takes place because of a difference in cross-sectional area of the slider subject to a downward hydraulic force. This slide is biased upward by a return spring (not shown). The control fluid is a lubricant and its circuit is located within the valve between its body and the slide so that the spring is immersed in the fluid. At the low end, this circuit is closed by a seal shown at 22.

The entire upper part of the valve may be conventional or like the designs of U.S. patent application Ser. Nos. 924,367, 924,368, or 924,438, each of which was filed on Oct. 29, 1986, the specifications of which are incorporated herein by reference, so that no further discussion will be offered herein on that subject.

The valve body comprises several tubular parts fastened to each other, in particular at the bottom by a lower sleeve 7 holding the seal 22 and the body is conventionally equipped with a balancing or compensating gate 13 issuing into the balancing chamber 13a. When the valve is being opened, this gate is actuated at the beginning of the descent of slide 9 by a cam 9a of this slide in order to balance the pressures inside and outside the valve.

The sleeve 7 is provided at its base with a screwed-on shutter 8. This shutter includes a movable sealing means comprising in this example a flap 11 hinging on the shutter body so as to be pivotable between an open position retracted sideways and a closed position where this flap seals the valve body by resting against a seal held by this body (FIG. 1). The flap 11 is biased toward the closed position by a spring 12 around its hinge pin. It should be noted that this sealing means is known per se and may a be also another type, for instance a ball-type wherein the seal is provided by a spherical portion moving in the longitudinal direction with an associated rotation between an open and closed position (with a spring biasing the ball toward the latter position).

Due to the hydraulic control, the slide 9 moves toward the low position until coming in contact with the valve tip 8a. Thereupon the slide repels the sealing means 11 and keeps it open. If the pressure of the control fluid drops by design or by accident, the return spring associated with the slide causes it to move upward until it is in the high position where it is retracted inside the lower sleeve 7. At that point the sealing means 11 is released and closes again due to the action of its own spring 12.

The type of valve described above frequently suffers from sealing defects either at the sealing means (flap 11 or ball member), or at the balancing gate 13.

Figure 2:
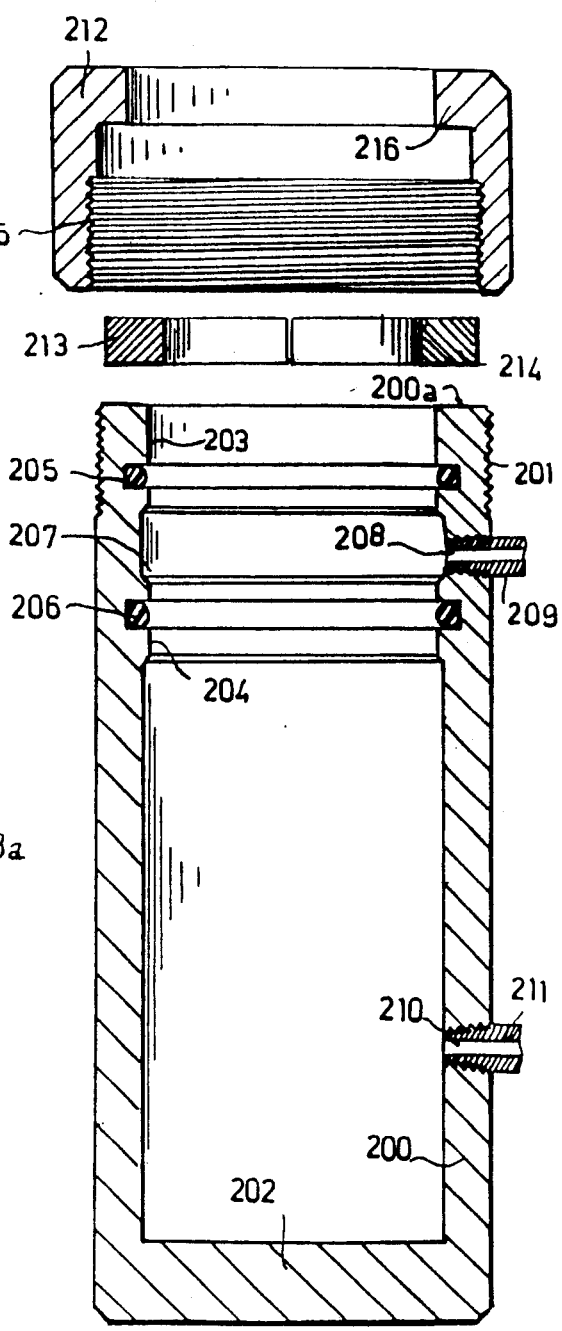
FIG. 2 is an axial sectional view of a balancing test cell of the valve in the disassembled state.

To detect these defects and to locate them, a test cell such as shown in FIG. 2 may be used advantageously either at manufacture or after the valve has been used for some time.

In order to make possible the tests using the cell, the valve sleeve 7 is provided on its outer periphery with an annular groove 7r located above the balancing gate 13. The cross-section of this groove is substantially rectangular as shown in FIG. 1.

The test cell of the invention comprises a tubular enclosure 200 with a diameter suitable for covering the valve body near its sleeve 7 and its shutter 8.

This enclosure is open at its top end which is provided with an outer thread 201 and is closed at its other end by a bottom 202.

The height of this enclosure is designed to allow housing the valve in it as far as its groove 7r.

In its upper part, the enclosure 200 has two inner cylindrical portions 203 and 204 of which the diameters except for a slight play correspond to the outer valve diameter on either side of its balancing gate 13.

Each portion 203 and 204 is provided with a groove into which is inserted a seal 205 and 206. These seals in this embodiment are O-rings and come to rest against the outer valve surface above and below the relief 13.

These cylindrical portions 203 and 204 furthermore are separated by an annular clearance 207 into which issues a so-called upper aperature 208. This aperture is threaded and connects to a pressurizing conduit 209.

The enclosure furthermore comprises another so-called lower aperture 210 near the bottom 202. This aperture 210 is threaded and connects to a pressurizing conduit 211.

Also, the test cell comprises a fixing ring 212 and two longitudinally locking semicircular keys 213 and 214.

The ring 212 is threaded at its lower portion 215 so it can be screwed onto the thread 201 of the enclosure 200. This ring also is provided with an upper locking collar 216 against which the keys 213 and 214 will come to rest.

Figure 3:
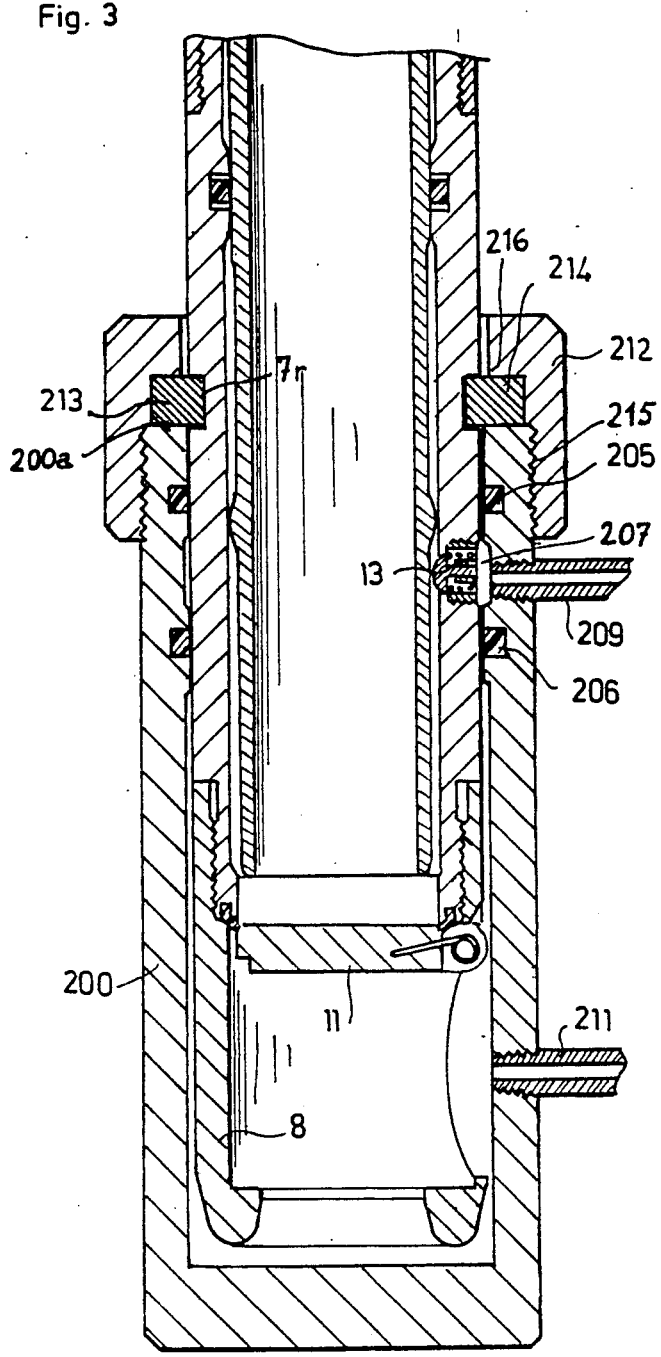
FIG. 3 is an axial sectional view illustrating the test procedure using the cell.

FIG. 3 shows the test cell in place on a valve for carrying out the tightness tests.

The ring 212 engages the valve body with its threaded part 215 pointing to the valve tip. Then the keys 213 and 214 are inserted into the groove 7r of the valve body, and are covered by the ring 212.

Next the lower part of the valve is introduced into the enclosure 200 until this enclosure makes contact with the ring 212. After the ring has been entirely screwed on the enclosure, the assembly is as shown in FIG. 3. The keys 213 and 214 are clamped between the ring collar 216 and the upper enclosure face 200a. The seals 205 and 206 are applied against the outer surface of the valve body on either side of the gate 13. The upper conduit 209 (issuing into the clearance 207) communicates with the gate 13 while the lower conduit 211 issues into the shutter 8 above the flap 11.

A first test was carried out by pressurizing the conduit 211 at about 200 bars. The absence of leakage showed proper flap assembly and its satisfactory tightness.

Another test was performed by pressurizing the conduit 209 (to about the same pressure). The absence of leakage showed the gate 13 was properly assembled and sealed adequately.

The test cell and the testing procedure are similar when the valve is provided with a ball type closure instead of the shutter.

While this invention has been described as having certain preferred features and emobdiments, it will be understood that it is capable of still further variation and modification without departing from the spirit of the invention, and this application is intended to cover any and all variations, modifications and adaptations of the invention as fall within the spirit of the invention and the scope of the appended claims.

I claim:

1. A cell for testing the sealing quality of an oilwell safety valve of the type comprising at least one valve body of a generally tubular shape and provided at its lower part with a balancing gate issuing into a balancing chamber and with a movable shutter for separating the balancing chamber from the lower end of the valve, said test cell comprising a tubular enclosure (200) for covering the valve body at its lower part near its tip and its balancing chamber, said enclosure comprising a bottom wall (202) for sealing the enclosure at its end on the valve tip side, means (201, 212-216) for fastening said enclosure to the valve body, two inner cylindrical portions (203,204) complementing the outer shape of the valve body near its balancing gate and on either side thereof, two seals (205,206) on each of said cylindrical portions so as to be above and below said balancing gate and resting against the valve body, an upper aperture (208) in the enclosure wall between said seals and issuing opposite balancing relief, a lower aperture (210) in the enclosure wall near its bottom to issue near the valve tip, and pressurizing conduits (209, 211) connected to said apertures.

2. A test cell as in claim 1, and wherein said fastening means includes a fastener ring (212) threaded at its lower part (215) and provided with an upper locking collar (216), an outer thread (201) at the high end of the enclosure (200) cooperating with the ring thread and at least one longitudinal locking key (213, 214) in said fastener ring (212) between the locking collar (216) and the upper end (200a) of the enclosure.

3. A cell as in claim 2 for testing the sealing of a valve having on the outside an annular groove (7r) above a balancing gate, each of said keys (213, 214) comprising a part shaped like a ring sector for insertion into said annular groove (7r) of the valve and for projecting between the locking collar (216) of the fastener ring and the upper end (200a) of the enclosure.

4. A test cell as in claim 3, comprising two identical semicircular keys (213, 214).

5. A test cell as in claim 3 in combination with an oil-well safety valve, said valve comprising a generally tubular valve body (7), a balancing gate (13) issuing at the lower part into a balancing chamber (13a), a mobile shutter (11) located at the lower part of said valve body whereby in the closed position said shutter separates said balancing chamber from the lower valve end; spring means (12) for biasing said shutter toward the closed position, and tubular slide means (9) arranged inside said valve body for actuating said shutter (11) toward its open position, said slide means including a return spring biasing said slide means toward a high position corresponding to closing of said shutter and hydraulic means for opening said shutter, said valve body (7) having on its outer periphery an annular groove (7r) located above the balancing gate (13) for securing said valve body in place in said test cell.

6. A test cell as in claim 5 and wherein said annular groove (7r) of the valve body is substantially rectangular in cross-section.

7. A test cell as in claim 1, and wherein said upper aperture (208) issues inside the enclosure (200) into an annular clearance (207) on the inside of said enclosure between said seal (205, 206).

8. A process for testing the sealing of a safety valve comprising engaging a fastener bush (212) of a test cell around the valve body (7), inserting a key (213, 214) into an annular groove (7r) of the valve, inserting the lower valve part into a tubular enclosure (200) of a test cell, threadedly engaging the fastening ring (212) on the threaded upper end (201) of said enclosure, providing seals (205, 206) on either side of the balancing gate (13) of the valve, and carrying out separately sealing tests on the valve balancing gate (13) and on its shutter (11) in the closed position by consecutively pressurizing conduits (209, 211) connected to said test cell.

* * * * *